United States Patent
Muthurajan et al.

(10) Patent No.: US 11,044,266 B2
(45) Date of Patent: Jun. 22, 2021

(54) SCAN ADAPTATION DURING SCAN EXECUTION

(71) Applicant: ENTIT SOFTWARE LLC, Sanford, NC (US)

(72) Inventors: Sasi Siddharth Muthurajan, Cambridge, MA (US); Ming Sum Sam Ng, Hong Kong (CN); Jeremy C. Brooks, Alpharetta, GA (US)

(73) Assignee: Micro Focus LLC, Santa Clara, CA (US)

( * ) Notice: Subject to any disclaimer, the term of this patent is extended or adjusted under 35 U.S.C. 154(b) by 294 days.

(21) Appl. No.: 16/078,777

(22) PCT Filed: Feb. 26, 2016

(86) PCT No.: PCT/US2016/019809
§ 371 (c)(1),
(2) Date: Aug. 22, 2018

(87) PCT Pub. No.: WO2017/146729
PCT Pub. Date: Aug. 31, 2017

(65) Prior Publication Data
US 2019/0052666 A1    Feb. 14, 2019

(51) Int. Cl.
*H04L 29/06* (2006.01)
*G06F 21/12* (2013.01)
*G06F 21/56* (2013.01)

(52) U.S. Cl.
CPC .......... *H04L 63/1433* (2013.01); *G06F 21/12* (2013.01); *G06F 21/56* (2013.01)

(58) Field of Classification Search
CPC ............... H04L 63/1433; H04L 63/145; H04L 63/1416; G06F 21/12; G06F 21/121; G06F 21/56; G06F 21/577
See application file for complete search history.

(56) References Cited

U.S. PATENT DOCUMENTS

| 6,530,024 | B1 | 3/2003 | Proctor |
| 7,178,166 | B1* | 2/2007 | Taylor ................... G06F 21/577 709/228 |
| 7,904,456 | B2* | 3/2011 | Hennan ............... H04L 63/1416 707/737 |
| 8,261,354 | B2 | 9/2012 | Kline et al. |
| 8,676,966 | B2 | 3/2014 | Podjarny et al. |
| 8,943,599 | B2 | 1/2015 | Guarnieri et al. |
| 9,122,503 | B1 | 9/2015 | Hoff |
| 9,503,421 | B2* | 11/2016 | Liang ..................... H04L 63/02 |
| 10,182,068 | B2* | 1/2019 | Munoz ................ H04L 63/1483 |

(Continued)

OTHER PUBLICATIONS

International Search Report and Written Opinion, International Application No. PCT/US2016/019809, dated Nov. 25, 2016, pp. 1-10, KIPO.

(Continued)

*Primary Examiner* — Hosuk Song

(57) ABSTRACT

In some examples, a system includes a scan execution engine and a scan adaptation engine. The scan execution engine may execute a scan of a web application hosted on a web host. During scan execution, the scan adaptation engine may adapt a subsequent scan portion for later execution based on a scan metric received from a monitoring agent that monitors the web application, the web host, or both.

20 Claims, 7 Drawing Sheets

(56) References Cited

U.S. PATENT DOCUMENTS

| | | | |
|---|---|---|---|
| 10,462,178 B2* | 10/2019 | Curtis | H04L 63/1433 |
| 10,652,254 B2* | 5/2020 | Kuperman | H04L 63/1425 |
| 2004/0215932 A1 | 10/2004 | Burky et al. | |
| 2011/0016513 A1 | 1/2011 | Bailey, Jr. | |
| 2013/0086688 A1 | 4/2013 | Patel et al. | |
| 2015/0281259 A1* | 10/2015 | Ranum | H04L 67/10 |
| | | | 726/24 |

OTHER PUBLICATIONS

Shelly, D., et al., Closing the Gap: Analyzing the Limitations of Web Application Vulnerability Scanners, The OWASP Foundation, Nov. 8-11, 2010, 42 pages.

Shelly, D.A., Using a Web Server Test Bed to Analyze the Limitations of Web Application Vulnerability Scanners, Thesis, Virginia Polytechnic Institute and State University Jul. 29, 2010, 100 pages.

* cited by examiner

SCAN ADAPTATION DURING SCAN EXECUTION

BACKGROUND

With rapid advances in technology, electronic devices have become increasingly prevalent in society today. Computing devices may allow users to execute or access web-based applications that provide various services and information. Web applications may be vulnerable to attack from cross-site scripting, phishing schemes, malware injections, and in other ways.

BRIEF DESCRIPTION OF THE DRAWINGS

Certain examples are described in the following detailed description and in reference to the drawings.

DETAILED DESCRIPTION

The discussion below refers to scans. A scan may refer to any logic, application, instructions, or program that scans a web application for security vulnerabilities. The scan may be performed by a scan system through a web front-end without access to the source code of the web application. In that regard, the scan or scanner may be categorized as a black-box or penetration testing tool. The scan may include scan requests sent to the web application to identify attack surfaces and launch attacks to identify security vulnerabilities or architectural weaknesses of the web application.

The discussion below also refers to subsequent portions of a scan. The term subsequent may refer to subsequent in scan execution order. That is, a subsequent portion of a scan may refer to a portion of the same scan that is later in an execution order has yet to execute in a particular scan execution, or for which execution will occur at a later time period (but during the same scan). Thus, subsequent scan portions or subsequent scan requests may refer to portions or scan requests of a scan that are subsequent in the execution order of a scan with reference to particular scan portion or other event. An adaptation to a subsequent scan portion may, for example, refer to adapting another scan portion of the scan that yet to execute as part of the scan.

The disclosure herein provides systems, methods, engines, and devices that may support adaptation of a scan during scan execution. In that regard, the scan adaptation features described herein may provide real-time, dynamic adaptations for a scan during execution of the scan itself. As described in greater detail below, a scan system may adapt a scan during scan execution in response to metrics measured for the scan, for a web host that hosts the application being scanned, or for both. Scan adaptations may include adjustments to a configuration for executing the scan (e.g., reconfiguring various scan parameters), the addition, removal, or modification of subsequent scan requests that have yet to be executed in the scan, adjustments to subsequent attack surface detections or attack patterns used in the scan, and more.

By adapting the scan during the scan execution, the scan system may dynamically and flexibly adapt the scan in real-time. By doing so, the scan adaptation features described herein may increase scan efficiency, as the real-time adaptations effectuated during scan execution may allow the scan system to continue execution without otherwise having to stop the scan, reconfigure scan parameters, and again restart the scan from the being of scan execution with the reconfigured parameters. The scan adaptation features described herein may thus provide reduced resource consumption, increased scan efficiency and effectiveness, or increased scan speeds.

Figure 1:
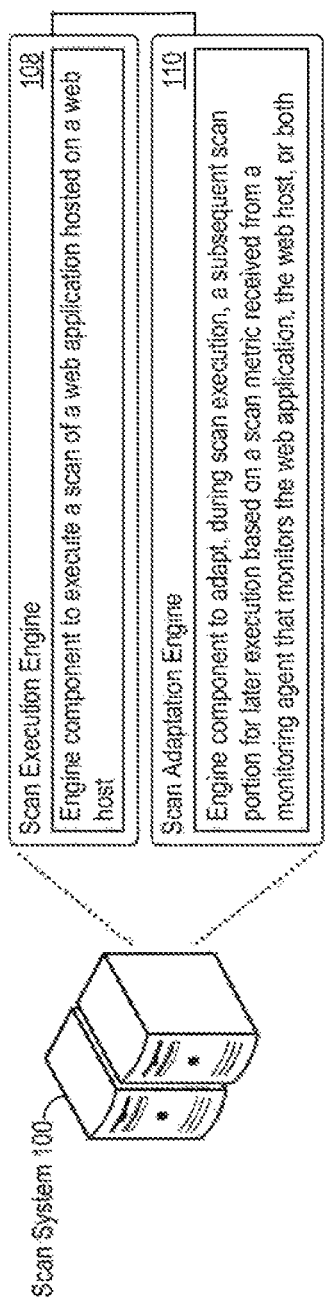
FIG. 1 shows an example of a scan system that supports scan adaptation during scan execution.

FIG. 1 shows an example of a scan system 100 that supports scan adaptation during scan execution. The scan system 100 may take the form of a computing system, including a single or multiple computing devices such as application servers, compute nodes, desktop or laptop computers, smart phones or other mobile devices, tablet devices, embedded controllers, and more.

The scan system 100 may execute a scan of a web application. The scan system 100 may also adapt the scan during execution to account for feedback with respect to the impact of the scan on the web application and a web host running the web application. As described in greater detail below, the scan system 100 may receive monitored feedback during execution of the scan, which may be referred to as scan metrics. A scan metric may include any data, event, characteristic, or any other measurement monitored with respect to the web application, the web host running the web application, or both. The scan system 100 may specify or configure particular scan metrics to receive, so scan metric specifications may be specified by a user or another management entity. The scan system 100 may adapt the scan in response to the received scan metrics, and to support such scan adaptation features, the scan system 100 may implement a scan execution engine 108 and a scan adaptation engine 110.

The scan system 100 may implement the scan execution engine 108 and the scan adaptation engine 110 (and components thereof) in various ways, for example as hardware and programming. The programming for the engines 108 and 110 may take the form of processor-executable instructions stored on a non-transitory machine-readable storage medium, and the hardware for the engines 108 and 110 may include a processing resource to execute those instructions. A processing resource may include various number of processors and may be implemented through a single-processor or multi-processor architecture. In some examples, the scan system 100 implements multiple engines using the same system features or hardware components (e.g., a common processing resource).

The scan execution engine 108 and scan adaptation engine 110 may include components to support scan execution and adaptation. In the example implementation shown in FIG. 1, the scan execution engine 108 includes an engine component to execute a scan of a web application hosted on a web host. As also shown in the example implementation of FIG. 1, the scan adaptation engine 110 includes an engine component to adapt, during scan execution, a subsequent scan portion for later execution based on a scan metric received from a monitoring agent that monitors the web application and the web host.

These and other example scan adaptation features that a scan system may perform during scan execution are described in greater detail next.

Figure 2:
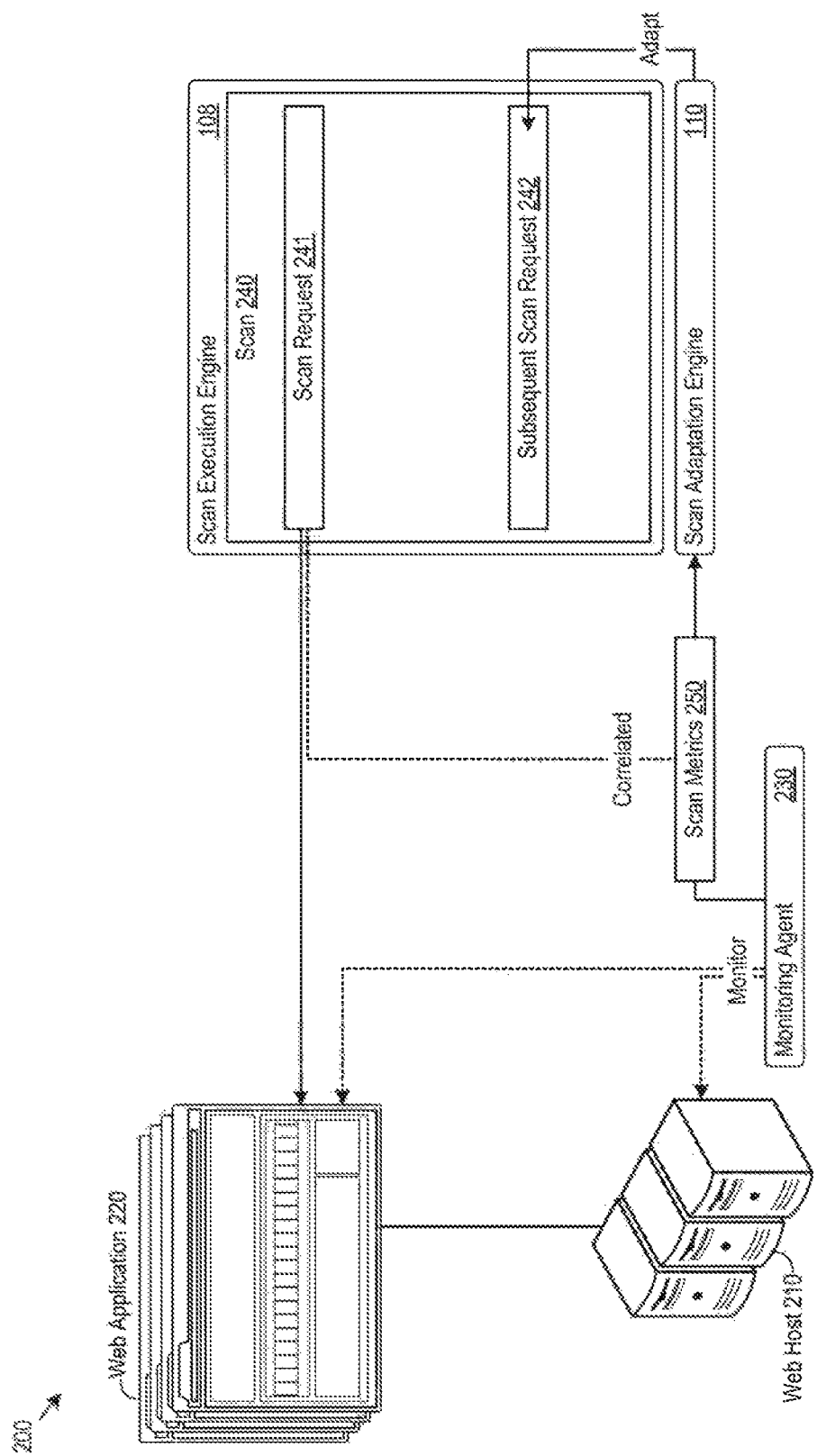
FIG. 2 shows an example of an architecture that supports scan adaptation during scan execution.

FIG. 2 shows an example of an architecture 200 that supports scan adaptation during scan execution. The architecture 200 includes the scan execution engine 108, the scan adaptation engine 110, as well as a web host 210 that hosts a web application 220. The web host 210 may be any computing system that hosts the web application 220, and may thus include web servers or other computing devices. In some examples, the web host 210 is logically distinct from the scan execution engine 108 and scan adaptation engine 110, though the web host 210 and engines 108 and 110 may share any number of common physical components. In other examples, the web host 210 is logically and physically separate from a scan system that implements the scan execution engine 108 and the scan adaptation engine 110. Also depicted in the example architecture 200 shown in FIG. 2 is a monitoring agent 230. The monitoring agent 230 may monitor the web host 210, the web application 220, or both.

In operation, the scan execution engine 108 may execute (e.g., perform) a scan of the web application 220. A scan may include various portions or phases, including attack surface discovery, attack simulations, web application probing, and more. A scan portion may be any part of the scan, and may refer to parts of a scan according to any level of granularity. Thus, a scan portion may include a single or multiple instruction executed by the scan execution engine 108, a single or multiple scan requests (or other communications sent to the web application 220), any number of phases within the scan, or any number of internal actions performed within the scan itself, such as parameter initializations, data staging, or various other actions. Different portions of a scan may be designed to test certain application elements, tiers, pages, resources, code segments, data flows, or any other aspect of the web application 220.

A scan may include scan requests. A scan request may refer to any request sent to the web application 220, to which the web application may provide a response. Example scan requests may thus include Hypertext Transfer Protocol (HTTP) requests of various types (e.g., request methods) and for particular web application resources. Example request types include GET method requests, POST method requests, PUT method requests, and the like. A scan request may therefore be of a particular request type and applicable to a particular web application resource (e.g., specified by a particular uniform resource locator (URL)). Execution of a scan may include sending the scan requests included within the scan to the web application 220. Through these scan requests and corresponding responses from the web application 220, the scan may test application behavior for vulnerabilities and weaknesses.

In FIG. 2, the scan execution engine 108 executes the scan 240. The scan 240 includes multiple requests, including the scan request 241 and the subsequent scan request 242. The scan request 241 may be of a particular request type, directed to a particular web application resource, and include any number of parameters, attachments, cookies, or other elements. The scan 240 may include other scan requests generated based on the scan request 241. In the example shown in FIG. 2, the subsequent scan request 242 is generated based on the scan request 241.

A scan request generated based on another scan request (e.g., a source scan request) may refer to any scan request that is generated, modified, or otherwise derived from the source scan request. In some examples, the generated scan request may be identical to the source scan request. As another example, a scan request generated from a source scan request may be a modified version of the source scan request, and differ in request type (e.g., differing HTTP request methods), targeted application resource(s) (e.g., differing URL or other resource indicators), and/or different parameters or other request portions. As one example, the scan request 241 may be part of a crawl phase of the scan 240 to discover attack surfaces of the web application 220, and the subsequent scan request 242 generated from the scan request 241 may include attack parameters designed to attack the web application 220 according to an attack surface identified by the scan request 241.

Execution of the scan 240 by the scan execution engine 108 may include sending the scan request 241 to the web application 220 as well as subsequent scan requests generated based on the scan request 241. Consistent with a previously presented example, the scan execution engine 108 may send the scan request 241 as part of a crawling phase of the scan 240 to identify attack surfaces of the web application 220. The scan execution engine 108 may subsequently send the subsequent scan request 242 (generated based on the scan request 241) as part of an attack phase, through which the scan 240 may assess response measures by the web application 220 to various attacks. Thus, in this example, the subsequent scan request 242 that is part of an attack phase of the scan 240 may be subsequent (in execution order) to the scan request 241 that is part of a crawl phase.

During execution of the scan 240, the scan adaptation engine 110 may adapt a subsequent portion of the scan 240 that has yet to be executed based on scan metrics measured for a previously executed portion of the scan 240. To illustrate through FIG. 2, the scan execution engine 108 sends the scan request 241 to the web application 220 as part of the scan 240. The web application 220 may process the scan request 241 and generate a response, which may include providing a requested web application resource, processing input data, invoking particular web technologies, referencing (e.g., loading) code libraries, and any other actions to process the scan request 241 and generate a response. In processing the scan request 241 and generating the response, the web application 220 may consume resources of the web host 210, including consumption of system memory, input/output ports, network bandwidth, or processor resources.

The monitoring agent 230 may track the behavior of the web application 220 and the web host 210 as the web application 220 processes and responds to the scan request 241. The monitoring agent 230 may log measurements, events, data, or characteristics observed for the web application 220 and the web host 210, logging such behaviors as scan metrics correlated to (e.g., caused by) the scan request 241. In the example shown in FIG. 2, the monitoring agent 230 sends the logged scan metrics correlating to the scan request 241 to the scan adaptation engine 110, e.g., as the scan metrics 250 shown in FIG. 2. Communication of the scan metrics by the monitoring agent 230 may occur in various ways, for example by including the scan metrics 250 as part of the response provided by the web application 220 to the scan request 241.

The scan adaptation engine 110 may identify the scan metrics 250 correlated to the scan request 241 and adapt subsequent execution of the scan 240 according to the received scan metrics 250. Through the feedback provided through the scan metrics 250 for the scan request 241, the scan adaptation engine 110 may determine the effect or impact the scan request 241 has on the web application 220 and the web host 210, and these effects and impacts may be likewise applicable to subsequent scan requests generated based on the scan request 241. Then, the scan adaptation engine 110 may adapt subsequent scan portions of the scan 240 that include or use the scan request 241 to, for example, increase positive performance impacts, reduce negative performance constraints, and the like.

In the example shown in FIG. 2, the scan adaptation engine 110 adapts the subsequent scan request 242 in response to the scan metrics 250 received from the monitoring agent 230 for the scan request 241 that the subsequent scan request 242 is generated based upon. Scan adaptations by the scan adaptation engine 110 may include any adjustment to the subsequent scan request 242, to subsequent scan portions that reference or use the subsequent scan request 242, or to any scan configuration used to execute subsequent scan portions including the subsequent scan request 242.

Specific examples of scan metrics as well as scan adaptations that the scan adaptation engine 110 may perform are described next in FIGS. 3-5. However, as additions or alternatives to the examples described next, the scan adaptation engine 110 may adapt the scan 240 in any way according to any number or combination of scan metrics measured by the monitoring agent 230 with respect to the web application 220, the web host 210, and more.

Figure 3:
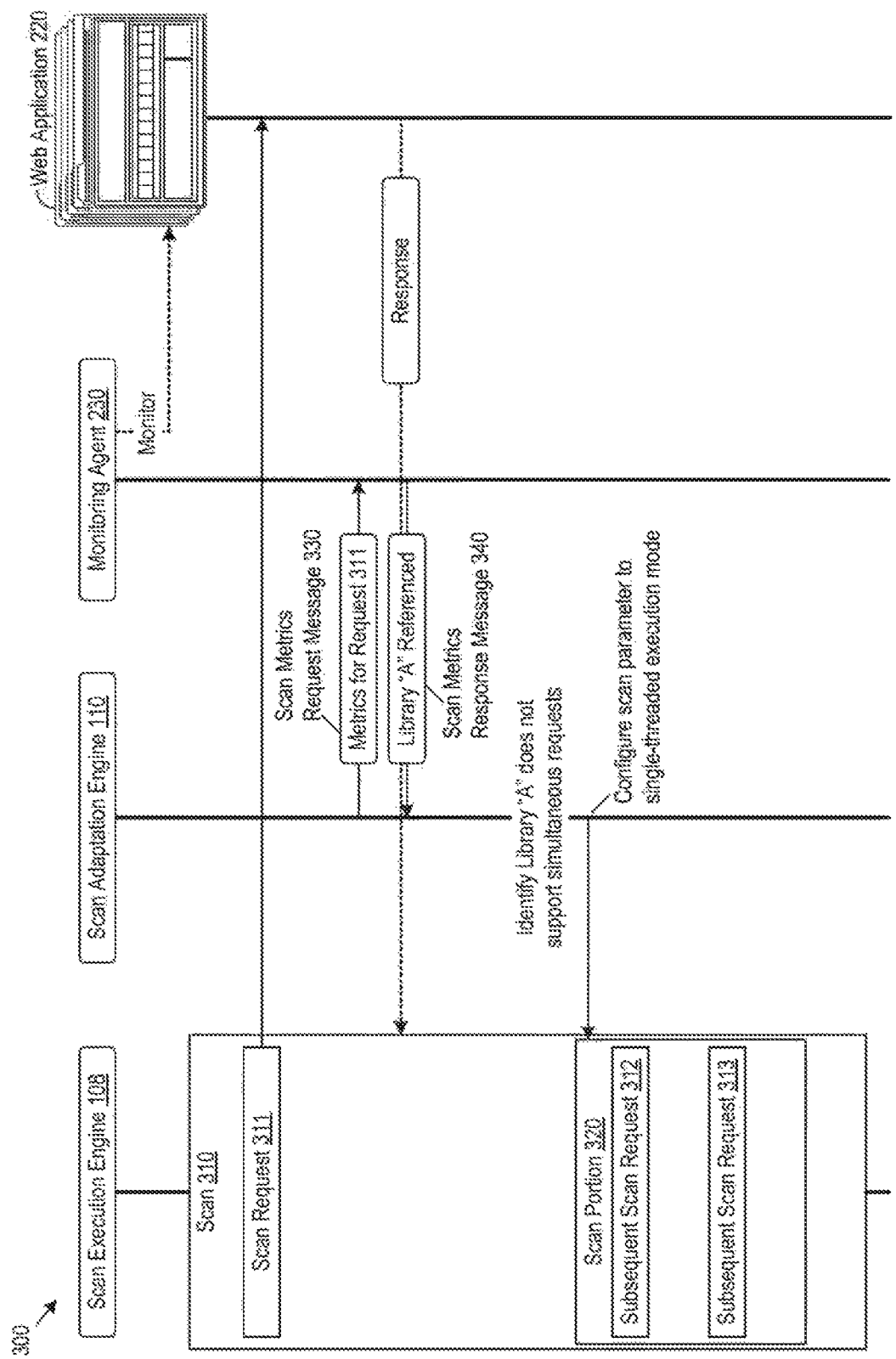
FIG. 3 shows an example of a scan adaptation that a scan adaptation engine may perform based on a library reference.

FIG. 3 shows an example of a scan adaptation that the scan adaptation engine 110 may perform based on a library reference in the example shown in FIG. 3, the scan execution engine 108 executes a scan 310, which includes a scan request 311 and subsequent scan requests 312 and 313 generated based on the scan request 311.

During scan execution, the scan execution engine 108 may send the scan request 311 to the web application 220. The scan adaptation engine 110 may request scan metrics from the monitoring agent 230 that monitors the web application 220. For example, the scan adaptation engine 10 may request scan metrics correlated to the scan request 311 sent as part of the scan 310. As one way to do so, the scan adaptation engine 110 may send a scan metrics request message 330 to the monitoring agent 230. The scan metrics request message 330 may take the form of an out-of-band communication between the scan adaptation engine 110 and the monitoring agent 230, and may specify the particular scan request for which scan metrics are requested (e.g., the scan request 311 sent by the scan execution engine 108 in FIG. 3). As another example, the scan adaptation engine 110 may embed the scan metrics request message 330 within a particular scan request itself, and the monitoring agent 230 may respond by providing the scan metrics measured for the web application 220 in processing and responding to the particular scan request.

The monitoring agent 230 may provide scan metrics correlated to a particular scan request through a scan metrics response message 340. The scan metrics response message 340 may be embedded as part of a response by the web application 220, as shown in FIG. 3. In that regard, the scan adaptation engine 110 may correlate the scan metrics included within the scan metrics response message 340 to the particular scan request that the response is generated for. In FIG. 3, the scan metrics response message 340 indicates that, in processing and responding to the scan request 311, the web application 220 references (e.g., loads or invokes) a particular code library, identified as Library "A". As examples, the library may be a Java Archive (JAR) file, any other Java class library, dynamic link library (DLL), or any various other code libraries.

The scan adaptation engine 110 may adapt a subsequent portion of the scan 310 in response to a scan metric indicating the web application 220 invokes, references, or loads a particular library. Various code libraries may have varying characteristics, and the scan adaptation engine 110 may adapt the scan 310 to, for example, increase scan performance or efficiency for particular referenced libraries. As one example shown in FIG. 3, the scan adaptation engine 110 may identify that the Library "A" invoked by the web application 220 does not support simultaneous requests. For example, the Library "A" may crash, hang without responding, or perform below a particular performance threshold when loaded, referenced, or otherwise accessed at multiple, simultaneous times by the web application 220. These and any other library performance characteristics may be specified in a set of library rules or properties that the scan adaptation engine 110 may access or implement, and the scan adaptation engine 110 may adapt a subsequent portion of me scan 310 to account for characteristics of a library referenced by the web application 220.

In the specific example shown in FIG. 3, the scan adaptation engine 110 adapts the scan portion 320, which includes subsequent scan requests 312 and 313 generated based on the scan request 311. The scan portion 320 adapted by the scan adaptation engine 110 is subsequent in execution order to the scan request 311 for which the scan metrics response message 340 indicates a reference of Library "A" by the web application 220. Accordingly, with a knowledge that the scan request 311 causes the web application to reference the Library "A", the scan adaptation engine 110 may determine or infer that subsequent scan requests 312 and/or 313 generated from the scan request 311 may likewise cause the web application 220 to reference Library "A". Accordingly, the scan adaptation engine 110 may adapt the scan portion 320 that includes identical or modified versions of the scan request 311, e.g., the subsequent scan requests 312 and 313 generated based on the scan request 311.

As seen in FIG. 3, the scan adaptation engine 110 adapts the scan portion 320 by configuring a scan parameter applicable to the execution of the scan portion 320. In particular, the scan adaptation engine 110 configures a scan parameter of the scan portion 320 to execute in a single-threaded execution mode, which may cause the scan execution engine 108 to send scan requests in a non-simultaneous manner during subsequent execution of the scan portion 320. Doing so may address a performance impact caused by referencing the particular Library "A" and cause the scan 310 to execute with increased efficiency and effectiveness.

The scan adaptation engine 110 may adapt the scan portion 320 (e.g., through a scan parameter adjustment) during scan execution, but prior to execution of the scan portion 320. In some examples, the scan adaptation engine 110 configures the scan parameter to execute in single-threaded execution mode for execution of the scan portion 320, and reconfigures the scan parameter back to a multi-threaded execution mode for other scan portions subsequent to the scan portion 320 (and not including any subsequent scan request generated based on the scan request 311 that would likewise cause the web application 220 to reference Library "A").

Thus, a scan metric may indicate the web application 220 references a particular library, e.g., referencing the particular library in response to a particular scan request. In such a case, the scan adaptation engine 110 may correlate the web application reference to the particular library to the particular scan request, e.g., through a determination that the scan sending the particular scan request causes the web application 220 to reference the particular library. The scan adaptation engine 110 may then adapt a subsequent scan portion during scan execution by switching from a multi-threaded execution mode to single-threaded execution mode for performing the subsequent scan portion, or in various other ways.

In the example above, the scan adaptation engine 110 configures a subsequent portion of the scan 310 during scan execution to address a performance characteristic of a library referenced by the scan 310. In a consistent manner, the scan adaptation engine 110 may adapt a scan (during scan execution) to account for the invocation of particular technologies or application logic, including technologies such as Java, Java Servlets, Active Server Pages (ASP), Common Gateway Interface (CGI), ColdFusion, Dart, PHP, Adobe Flash, any database technologies, and more. Along similar lines, the scan adaptation engine 110 may adapt a scan in response to monitored application program interface (API) calls, database accesses, application commands, particular application workflows, and more. The scan adaptation engine 110 may identify invocations or occurrences for any of the above examples as a scan metric measured by the monitoring agent 230 during scan execution, and dynamically adapt a scan during execution accordingly.

Figure 4:
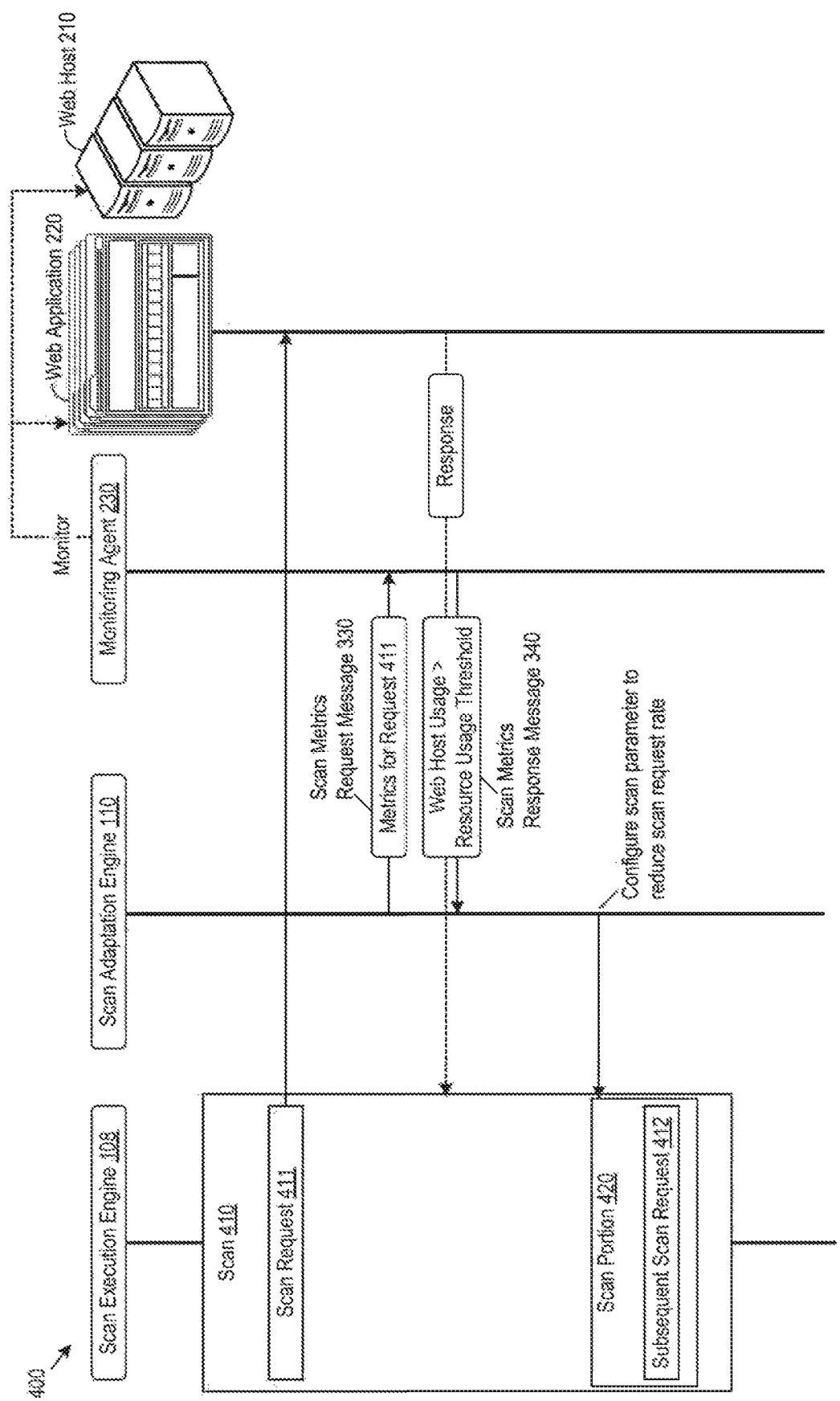
FIG. 4 shows an example of a scan adaptation that the scan adaptation engine may perform based on resource usage of a web host.

FIG. 4 shows an example of a scan adaptation that the scan adaptation engine 110 may perform based on resource usage of a web host 210. In FIG. 4, the scan execution engine 108 executes the scan 410, which includes a scan request 411 and a subsequent scan request 412 that is part of a scan portion 420 subsequent to the scan request 411. In the example shown in FIG. 4, the subsequent scan request 412 is generated based on the scan request 411.

During scan execution, the scan execution engine 108 may send the scan request 411 to the web application 220. The scan adaptation engine 110 may send a scan metrics request message 330 to a monitoring agent 230, and the monitoring agent 230 may provide a scan metrics response message 340. The scan metrics response message 340 may be specifically correlated to a scan request, a embedded within a response by the web application 220 to the correlated scan request. In the example shown in FIG. 4, the scan metrics response message 340 indicates that resource usage of the web host 210 exceeds a resource usage threshold when the web application 220 processes and responds to the scan request 411. The resource usage threshold may specify a threshold CPU utilization rate, a network bandwidth usage threshold, memory or I/O usage consumption thresholds, or any other measurable threshold relating to resource usage of the web host 210.

Through the received scan metric measured for the web host 210, the scan adaptation engine 110 may adapt subsequent portion of the scan 410 during scan execution. That is, the scan adaptation engine 110 may infer that execution of subsequent scan portions that include scan requests identical to or modified from the scan request 411 may likewise cause the web host 210 to exceed the resource usage threshold. As such, the scan adaptation engine 110 may adjust any number of scan parameters to reduce resource consumption by the web host 210 in responding to these subsequent scan portions or subsequent scan requests. In FIG. 4, the scan adaptation engine 110 adapts the scan portion 420 prior to execution of the scan portion 420 (which includes the subsequent scan request 412 generated based on the scan request 411), and does so by reducing a scan request rate applicable to execution of the scan portion 420.

A scan request rate may refer to any value that affects a rate which the scan execution engine 108 executes the scan 410 or sends scan requests as part of the scan 410. For example, a scan request rate may specify a threshold number (e.g., upper limit) of simultaneous requests the scan execution engine 108 sends to the web application 220 when executing the scan portion 420 other examples, the scan request rate may specify a threshold, target, or average value for the number of execution threads the scan execution engine 108 maintains in performing the scan 410, the number of scans requests the scan execution engine 108 sends over a predetermined period of time, the periodicity of scan requests sent to the web application 220, and the metric may indicate the web host 210 exceeds a resource usage threshold, e.g., in response to the scan sending particular scan request. The adaptation engine 110 may correlate the web host exceeding the resource usage threshold to the particular scan request, and the scan adaptation engine 110 may adapt a subsequent scan portion during scan execution by reducing a scan request rate for performing the subsequent scan portion that includes a subsequent scan request generated based on the particular scan request.

Additionally or alternatively, the scan adaptation engine 110 may adapt the scan portion 420 in other ways to control the resource consumption of the web host 210, e.g., to ensure that resource consumption is below the resource usage threshold in responding to a particular scan request. The scan adaptation engine 110 may switch to a single-threaded execution mode, modify an execution order of the scan portion 420 to reduce the resource impact of sending the scan request 411 to the web application 220, or in other ways.

As another example relating to resource consumption by the web host 210, the scan adaptation engine 110 may adapt a scan portion of the scan 410 subsequent to the scan request 411 regardless of the scan requests included in the scan portion. That is, upon identifying that resource consumption by the web host 210 exceeds the resource usage threshold, the scan adaptation engine may adapt any subsequent scan request or scan portion to reduce resource usage by the web host 210.

For example, the scan adaptation engine 110 may inject delays into scan requests sent to the web application 220, such as delaying the next "X" number of scan requests immediately subsequent to the scan request 411 in the execution order of the scan 410. The delay may be of a predetermined value configured by the scan adaptation engine 110, a user, or any other management entity, for example, and the reduced rate at which scan requests are sent by the scan execution engine 108 may have the effect of reducing resource consumption by the web host 210 below the resource usage threshold. In some examples, the scan adaptation engine 110 ceases injecting delay into the scan request transmissions (or otherwise reducing the scan request rate) upon receiving a scan metric that the resource consumption by the web host 210 has fallen below the resource usage threshold (e.g., fallen to a predetermined level below the resource usage threshold).

While the example shown in FIG. 4 describes scan adaptations that the scan adaptation engine 110 may perform in response to resource usage monitored for the web host 210, the scan adaptation engine 110 may perform scan adaptations for any monitored characteristic of the web host 210. Example scan metrics attributable to the web host 210 include a number of other applications running on the web host 210, hardware temperatures of the web host 210, user sessions active on the web host 210, remaining battery power of the web host 210, network availability, hardware configurations, or any other monitored aspect or combination of monitored aspects application to the web host 210.

Moreover, the scan adaptation engine 110 may additionally or alternatively adapt scan portions of the scan 410 to increase the resource consumption of the web host 210 as well. The scan adaptation engine 110 may do so when a web application response to a particular scan request causes the web host 210 to consume less than low resource usage threshold, which may indicate that a particular amount of resources of the web host 210 are unused, for example. In this example, reception of such a scan metric may indicate (e.g., the scan adaptation engine 110 may determine from the scan metric) that the scan execution engine 108 can increase the scan request rate or perform various other scan adaptations for a subsequent scan portion (also including or using a subsequent scan request generated based on the particular scan request) so as to consume the unused web host resources or utilize web host resources in a more efficient matter. Such scan adaptations may result in increased scan efficiency and a shorter execution time. Thus, the scan adaptation engine 110 may perform various scan adaptations during scan execution to account for scan metrics measured for the web host 210.

Figure 5:
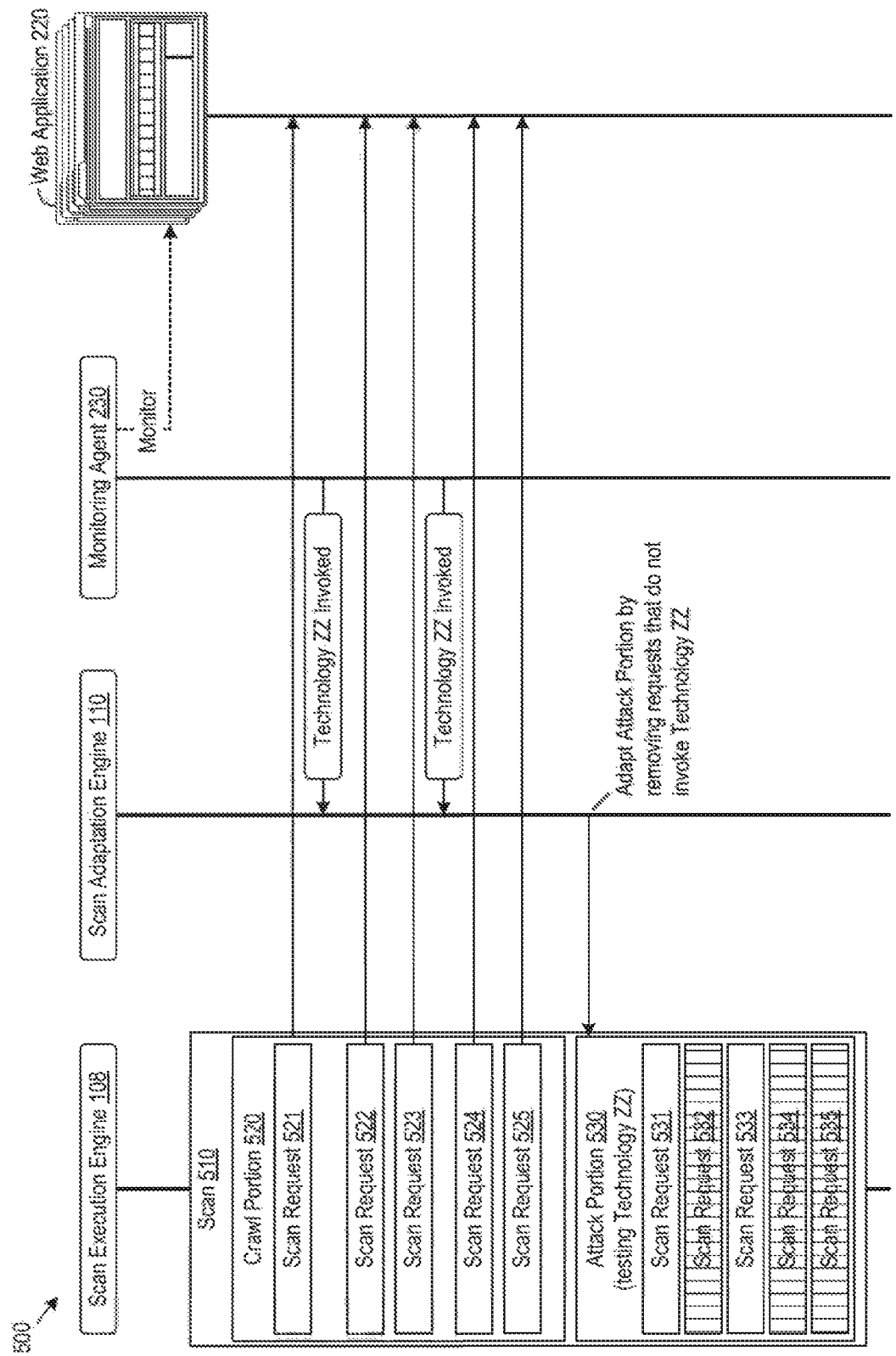
FIG. 5 shows an example of a scan adaptation that the scan adaptation engine may perform based on technology invocations by particular scan requests of a scan.

FIG. 5 shows an example of a scan adaptation that the scan adaptation engine 110 may perform based on technology invocations by particular scan requests of a scan. In FIG. 5, the scan execution engine 108 executes a scan 510 which includes a crawl portion 520 and an attack portion 530. The crawl portion 520 of a scan 510 may crawl the web application 220 using scan requests to identify attack surfaces of the web application 220. The attack portion 530 of the scan 510 may be subsequent to the crawl portion 520, and may test for vulnerabilities and architectural weaknesses in the web application 220 through actual attacks on the web application 220 (using scan requests). In FIG. 5, the crawl portion 520 includes the scan requests labeled as scan requests 521, 522, 523, 524, and 525. The attack portion 530 shown in FIG. 5, prior to scan adaptation, also includes the scan requests 531, 532, 533, 534, and 535, which may be generated based on the scan requests 521, 522, 523, 524, and 525 respectively (e.g., modified versions that include attack parameters). The attack portion, including scan requests 531, 532, 533, 534, and 535 may be designed to test the web application 220 for vulnerabilities involving a particular technology, such as the technology labeled as technology "ZZ" in FIG. 5. The attack portion 530 may be one of multiple attack portions in the scan 510.

During execution of the crawl portion 520, the scan execution engine 108 sends each of the scan requests 521, 522, 523, 524, and 525 to the web application 220. The monitoring agent 230 determines that the web application 220 invokes technology "ZZ" in responding to scan requests 521 and 523, but not in responding to scan requests 522, 524, and 525. The monitoring agent 230 may communicate the indications of technology invocation through scan metrics response messages particular to scan requests 521 and 523, e.g., as part of the response by the web application 220 to these scan requests. As such, the scan adaptation engine 110 may determine that the web application 220 invokes a particular technology for some, but not all, of the scan requests sent to the web application 220 and adapt a subsequent portion of the scan accordingly.

In FIG. 5, the scan adaptation engine 110 adapts the attack portion 530 of the scan 510 during scan execution, but prior to execution of the attack portion 530. In particular, the scan adaptation engine 110 adapts the attack portion 530 by removing the attack scan requests generated based on corresponding crawl scan requests that do not invoke technology "ZZ". That is, the scan adaptation engine 110 may adapt the attack portion 530 during scan execution by removing the scan requests 532, 534, and 535 from the attack portion 530, as these scan requests 532, 534, and 535 were generated from scan requests that do not invoke technology "ZZ". Doing so may reduce resource consumption and increase scan efficiency as the removed scan requests do not invoke the particular technology the attack portion 530 is designed to test. Put another way, since the scan requests 522, 524, and 525 do not cause the web application 220 to invoke a particular technology in responding to these requests, the scan adaptation engine 110 may perform a scan adaptation through the removal of subsequent scan portions that utilize or are generated based on these scan requests 522, 524, and 525, e.g., the scan requests 532, 534, and 535 in FIG. 5.

To provide a concrete illustration, an attack portion of scan may include a set of attacks designed test vulnerabilities for a Java mail library in the web application 220. During a crawl portion, the scan adaptation engine 110 may receive scan metrics indicating that a particular subset of scan requests sent in the crawl portion cause the web application 220 to invoke the Java mail library, whereas other scan requests of the crawl portion do not. During the scan execution and prior to execution of the attack portion, the scan adaptation engine 110 may adapt the attack portion by removing any subsequent attack scan requests generated from the crawl scan requests that do not cause the web application 220 to invoke the Java mail library. The scan adaptation engine 110 may retain the attack scan requests generated from the subset of crawl scan requests that cause the web application 220 to invoke the Java mail library.

Thus, a scan metric may indicate the web application 220 invokes a particular technology, e.g., in response to particular scan request. The scan adaptation engine 110 may, in this example, correlate the web application invocation of the particular technology to the particular scan request. The scan adaptation engine 110 may then adapt a subsequent scan portion by retaining a subsequent scan portion as part of the scan, wherein the subsequent scan portion includes a subsequent scan request generated based on the particular scan request and is designed to test the particular technology. The scan adaptation engine may also remove a different scan portion from the scan that has yet to be executed as part of the scan, wherein the different scan portion is designed to test the particular technology but does not include any subsequent scan request generated based on the particular scan request (e.g., another scan request that does not invoke the particular technology).

As described above, the scan adaptation engine 110 may adapt a scan during scan execution based on particular technologies invoked by the web application 220 and the particular scan request(s) that cause the web application 220 to do so. In a consistent manner, the scan adaptation engine 110 may tailor attack portions or other subsequent scan portions to account for API calls, application events, or any other monitored scan metric.

As an illustrative example, a scan metric may indicate the web application 220 invokes a particular technology, e.g., in response to a particular scan request. In this example, the scan adaptation engine 110 may correlate the web application invocation of the particular technology to the particular scan request. The scan adaptation engine 110 may also adapt a subsequent scan portion by retaining the subsequent scan portion as part of the scan, for example responsive to the subsequent scan portion including a subsequent scan request generated based on (e.g., identical to or modified based on) the particular scan request and is designed to test the particular technology. Further, the scan adaptation engine 110 may remove a different scan portion that has yet to be executed as part of the scan, for example responsive to the different scan portion including a subsequent scan request generated based on the particular scan request but is designed to test another technology different from the particular technology.

To illustrate concretely, the scan adaptation engine 110 may determine during a scan metric received during a crawl phase that a particular scan request causes the web application 220 to invoke a Java technology, in this case, the scan adaptation engine 110 may determine to retain a subsequent attack scan request generated using or based on the particular scan request designed to test for Java-based vulnerabilities, but remove another attack also generated using or based on the particular scan request in another subsequent attack portion of the scan, but designed to test for PHP-based vulnerabilities While some example scan adaptations that the scan adaptation engine 110 may perform have been described above, many more scan adaptations are possible.

Figure 6:
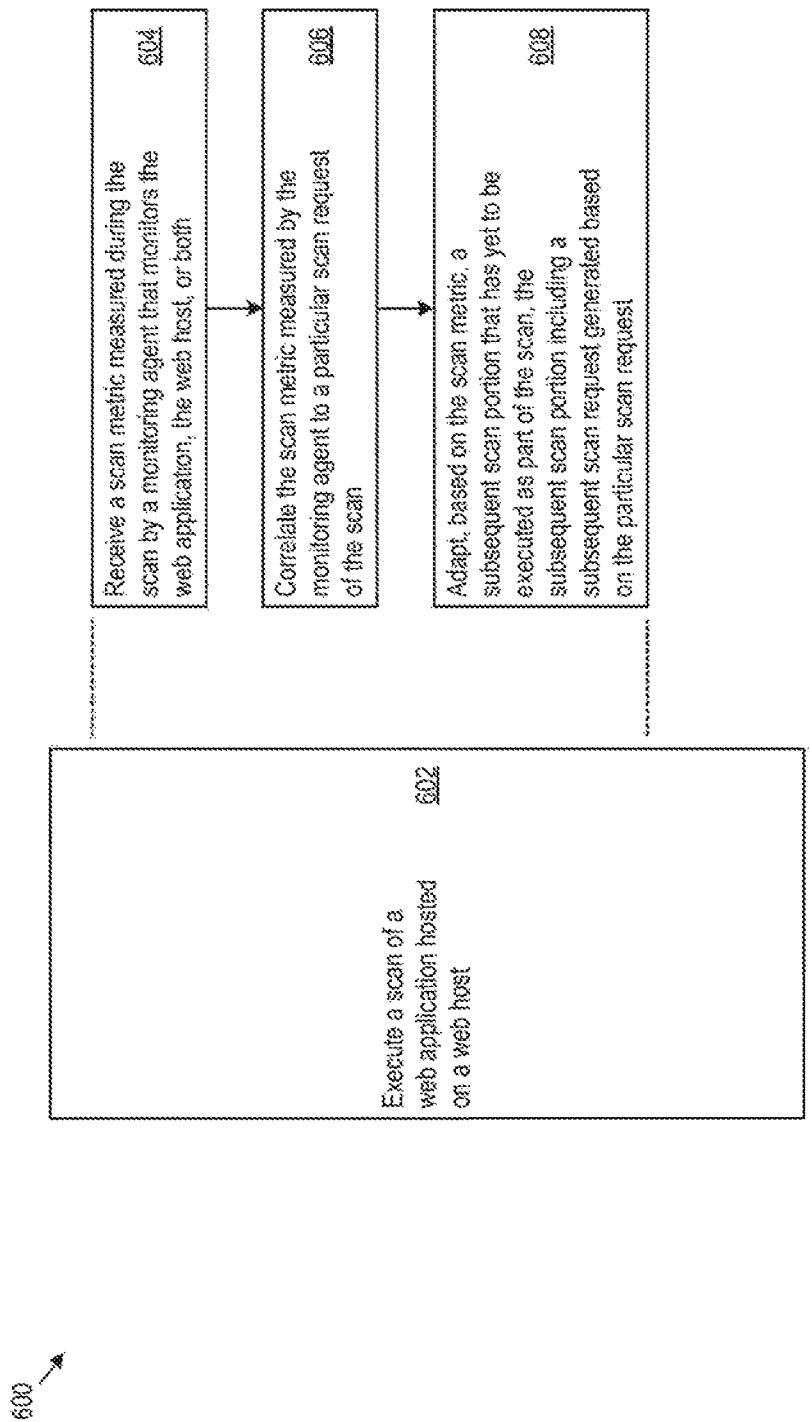
FIG. 6 shows an example of logic that a system or device may implement to support scan adaptation during scan execution.

FIG. 6 shows an example of logic 600 that a system or device may implement to support scan adaptation during scan execution. A scan system may implement the logic 600 as hardware, executable instructions stored on a machine-readable medium, or as combinations of both. In some examples, the scan system implements the logic 600 through the scan execution engine 108 and the scan adaptation engine 110, by which the scan system may perform or execute the logic 600 as a method for scan execution and adaptation. As another example, the logic 600 may be a method implemented or performed by a physical processing resource executing computer-readable instructions.

In implementing or performing the logic 600, the scan execution engine 108 may execute a scan of a web application hosted on a web host (602). During scan execution, the scan adaptation engine 110 may receive a scan metric measuring during the scan by a monitoring agent that monitors the web application, the web host or both (604) and correlate the scan metric measured by the monitoring agent to a particular scan request of the scan (606).

As noted above, the particular scan request may have been sent to the web application as part of the scan execution. In some examples, a response by the web application to the particular request also includes the scan metrics measured for the web application, the web host, or both, responsive to that particular scan request. As such, the scan adaptation engine 110 may correlate the scan metric by identifying the particular scan request that the web application response (including the scan metric) responds to. In other examples, the monitoring agent may provide scan metrics to the scan adaptation engine 110 separate from responses by the web application. In doing so, the monitoring agent may specify which scan request(s) the scan metrics were responsive to, by which the scan adaptation engine 110 may correlate scan metrics to particular scan requests.

During execution of the scan, the scan adaptation engine 110 may adapt the scan based on received scan metrics measured by the monitoring agent. In implementing the logic 600, the scan adaptation engine 110 may adapt, based on the scan metric, a subsequent scan portion that has yet to be executed as part of the scan, the subsequent scan portion including a subsequent scan request generated based on the particular scan request (608). Scan adaptations may include adjusting a scan parameter for a scan request in the subsequent scan portion, removing a scan request in the subsequent scan portion, or combinations of both.

The logic 600 may include any number of additional or alternative features that the scan adaptation engine 110 may implement or perform. In particular, the logic 600 may include various scan adaptations based on the content of the scan metric. For example, the scan metric may indicate the web application references a particular library. The particular library referenced by the web application may be incompatible or have decreased performance in processing multiple requests in parallel or simultaneously. In this example, the scan adaptation engine 110 may correlate the web application reference to the particular library to a particular scan request (that causes the library reference by the web application 220). Then, the scan adaptation engine 110 may adapt the subsequent scan portion by switching from a multi-threaded execution mode to a single-threaded execution mode for performing the subsequent scan portion (which may include a subsequent scan request generated based on the particular scan request), or by otherwise reducing a scan rate at which concurrent scan requests are sent to the web application.

As another example of various scan metrics, the scan metric may indicate the web application invokes a particular technology, e.g., in response to the particular scan request. As such, the scan adaptation engine 110 may correlate the scan metric to a particular scan request, and then adapt the subsequent scan portion by removing the subsequent scan portion including a subsequent scan request generated based on the particular scan request from the scan. The scan adaptation engine 110 may do so because the subsequent scan portion is designed to test another technology different from the particular technology. Such a scenario may occur for a particular scan request that causes the web application to invoke a Java technology, as an illustrative example. In this example, the scan adaptation engine 110 may remove a subsequent attack in the scan generated based on the particular scan request, but designed to test a PHP-based vulnerability instead of a Java-based vulnerability.

Continuing the examples of various scan metrics, the scan metric may indicate the web application does not invoke a particular technology, e.g., in responding to a particular scan request that the scan adaptation engine 110 may correlate to the scan metric. In this case, the scan adaptation engine 110 may remove the subsequent scan request from the scan because the subsequent scan request is designed to test the particular technology. As yet another example, the scan metric may indicate the web host exceeds a resource usage threshold responsive to the scan sending the particular scan request, in which case the scan adaptation engine 110 may adapt the subsequent scan portion by reducing a number of execution threads of the scan for performing the subsequent scan portion that includes the particular scan request.

Figure 7:
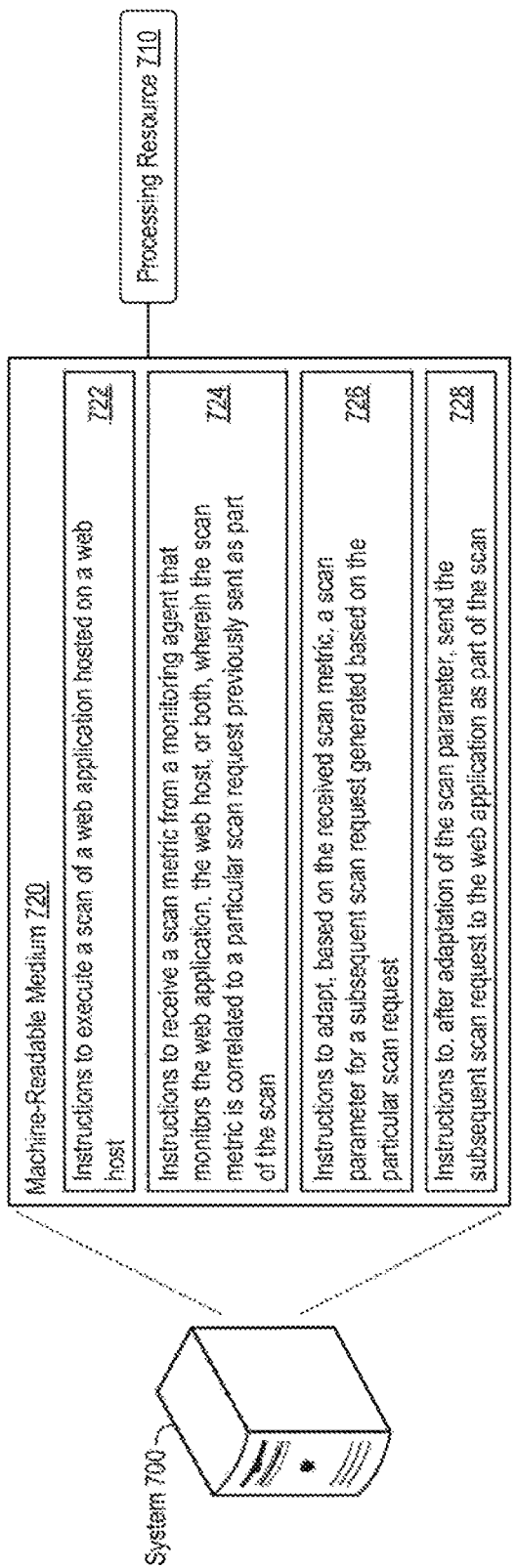
FIG. 7 shows an example of a system that supports scan adaptation during scan execution.

FIG. 7 shows an example of a system 700 that supports scan adaptation during scan execution. The system 700 may include a processing resource 710, which may take the form of physical hardware including a single or multiple processors. The processor(s) of a processing resource 710 may include a central processing unit (CPU), microprocessor, or any hardware device suitable for executing instructions stored on a machine-readable medium, such as the machine-readable medium 720 shown in FIG. 7. The machine-readable medium 720 may be any non-transitory electronic, magnetic, optical, or other physical storage device that stores executable instructions, such as the instructions 722, 724, 726, and 728 in FIG. 7. As such, the machine-readable medium 720 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The system 700 may execute instructions stored on the machine-readable medium 720 through the processing resource 710. Executing the instructions may cause the system 700 to perform any of the scan adaptation features described herein, including according to any features of the scan execution engine 108, the scan adaptation engine 110, or both. For example, execution of the instructions 722, 724, 726, and 728 by the processing resource 710 may cause the system 700 to execute a scan of a web application hosted on a web host; and during scan execution, receive a scan metric from a monitoring agent that monitors the web application and the web host, the scan metric correlated to a particular scan request previously sent as part of the scan; adapt, based on the received scan metric, a scan parameter for a subsequent scan request of the same request type and targeting the same application resource as the particular scan request; and after adaptation of the scan parameter, send the subsequent scan request to the web application as part of the scan.

In some examples, the scan parameter includes a scan thread parameter that is set to a multi-threaded execution mode prior to scan execution. In this example, the machine-readable medium 720 may include instructions executable by the processing resource 710 to adapt the scan parameter by setting the scan thread parameter to a single-threaded execution mode for sending the subsequent scan request and send the subsequent scan request in a single-threaded execution mode instead of the multi-threaded execution mode as was configured prior to the scan execution. The machine-readable medium 720 may also include instructions executable by the processing resource 710 to, after sending the subsequent scan request in the single-threaded execution mode, reset the scan thread parameter back to the multi-threaded execution mode prior to sending a different scan request also part of the scan.

As described above, a scan system may support flexible adaptations of a scan during execution of the scan itself. The scan adaptations supported by the scan adaptation engine 110 may provide increased scan efficiency and reduced resource consumption by the scan system, the web application 220, a web host 210, or combinations thereof. As the scan system may perform the scan adaptations during the scan execution itself, the scan system may conserve system resources and increase scan speed and efficiency by adapting scan parameters and scan requests without having to stop the present scan, reconfigure parameters, and restart another scan from the beginning. Thus, the scan system may also provide increased scan flexibility, quality, and speed as well.

The systems, methods, devices, engines, and logic described above, including the scan execution engine 108 and the scan adaptation engine 110, may be implemented in many different ways in many different combinations of hardware, logic, circuitry, and executable instructions stored on a machine-readable medium. For example, the scan execution engine 108, the scan adaptation engine 110, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the scan execution engine 108, the scan adaptation engine 110, or both.

The processing capability of the systems, devices, and engines described herein, including the scan execution engine 108 and the scan adaptation engine 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system, comprising:
a scan execution engine configured to execute a present scan of a web application hosted on a web host; and
a scan adaptation engine configured to adapt, during execution of the present scan, a subsequent scan portion of the web application for later execution based on a scan metric received from a monitoring agent that monitors the web application, the web host, or both,
wherein the present scan includes a plurality of scan requests and wherein the subsequent scan portion of the web application includes adding at least another scan request to the plurality of scan requests.

2. The system of claim 1, wherein the scan adaptation engine is further configured to correlate the scan metric to a particular scan request; and
wherein the scan adaptation engine is configured to adapt, as the subsequent scan portion of the web application, a subsequent scan request generated based on the particular scan request.

3. The system of claim 1, wherein the scan metric indicates the web application references a particular library;
wherein the scan adaptation engine is further configured to correlate the web application reference to the particular library to a particular scan request; and
wherein the scan adaptation engine is configured to adapt the subsequent scan portion of the web application during execution of the present scan by switching from a multi-threaded execution mode to single-threaded execution mode for performing the subsequent scan portion of the web application, wherein the subsequent scan portion of the web application includes a subsequent scan request generated based on the particular scan request.

4. The system of claim 1, wherein the scan metric indicates the web application invokes a particular technology;
wherein the scan adaptation engine is further configured to correlate the web application invoking the particular technology to a particular scan request;
wherein the scan adaptation engine is configured to adapt the subsequent scan portion of the web application by retaining the subsequent scan portion of the web application as part of the present scan, wherein the subsequent scan portion of the web application includes a subsequent scan request generated based on the particular scan request and is designed to test the particular technology; and wherein the scan adaptation engine is further configured to remove a different scan portion of the web application that has yet to be executed as part of the present scan, wherein the different scan portion includes another subsequent scan request generated based on the particular scan request but is designed to test another technology different from the particular technology.

5. The system of claim 1, wherein the scan metric indicates the web application invokes a particular technology;

wherein the scan adaptation engine is further configured to correlate the web application invoking the particular technology to a particular scan request;

wherein the scan adaptation engine is configured to adapt the subsequent scan portion of the web application by retaining the subsequent scan portion of the web application as part of the present scan, wherein the subsequent scan portion of the web application includes a subsequent scan request generated based on the particular scan request and is designed to test the particular technology; and wherein the scan adaptation engine is further configured to remove a different scan portion of the web application from the present scan that has yet to be executed as part of the present scan, wherein the different scan portion is designed to test the particular technology but does not include any subsequent scan request generated based on the particular scan request.

6. The system of claim 1, wherein the scan metric indicates the web host exceeds a resource usage threshold; and wherein the scan adaptation engine is configured to adapt the subsequent scan portion of the web application during execution of the present scan by reducing a scan request rate for performing the subsequent scan portion of the web application.

7. The system of claim 1, wherein the scan metric indicates the web host exceeds a resource usage threshold; and wherein the scan adaptation engine is configured to adapt the subsequent scan portion of the web application during execution of the present scan by reducing a number of execution threads of the present scan for performing the subsequent scan portion of the web application.

8. A method implemented by a physical processing resource executing computer-readable instructions, the method comprising:

executing a present scan of a web application hosted on a web host; and while executing the present scan:

receiving a scan metric measured during the present scan by a monitoring agent that monitors the web application, the web host, or both;

correlating the scan metric measured by the monitoring agent to a particular scan request of a plurality of scan requests of the present scan; and adapting, based on the scan metric, a subsequent scan portion of the web application of the present scan that has yet to be executed as part of the present scan, the subsequent scan portion of the web application including adding a subsequent scan request generated based on the particular scan request.

9. The method of claim 8, wherein the scan metric indicates the web application references a particular library;

wherein correlating the scan metric comprises correlating the web application reference to the particular library to the particular scan request; and wherein adapting the subsequent scan portion of the web application comprises switching from a multi-threaded execution mode to a single-threaded execution mode for performing the subsequent scan portion of the web application.

10. The method of claim 8, wherein the scan metric indicates the web application invokes a particular technology; and wherein correlating the scan metric comprises correlating the web application invocation of the particular technology to the particular scan metric; and wherein adapting the subsequent scan portion of the web application comprises removing the subsequent scan portion of the web application from the present scan because the subsequent scan portion of the present scan is designed to test another technology different from the particular technology.

11. The method of claim 8, wherein the scan metric indicates the web application does not invoke a particular technology;

wherein correlating scan metric comprises correlating the web application not invoking the particular technology to the particular scan request; and wherein adapting the subsequent scan portion of the web application, comprises removing the subsequent scan portion of the web application from the present scan because the subsequent scan portion of the present scan is designed to test the particular technology.

12. The method of claim 8, wherein the scan metric indicates the web host exceeds a resource usage threshold;

wherein adapting the subsequent scan portion of the web application comprises reducing a number of execution threads of the present scan for performing the subsequent scan portion of the web application.

13. A non-transitory machine-readable medium comprising instructions executable by a physical processing resource to:

execute a present scan of a web application hosted on a web host; and during execution of the present scan:

receive a scan metric from a monitoring agent that monitors the web application, the web host, or both, wherein the scan metric is correlated to a particular scan request of a plurality of scan requests previously sent as part of the present scan;

adapt, based on the received scan metric, a scan parameter for adding a subsequent scan request generated based on the particular scan request; and after adaptation of the scan parameter, send the subsequent scan request to the web application as part of the present scan.

14. The non-transitory machine-readable medium of claim 13, wherein the scan parameter comprises a scan thread parameter that is set to a multi-threaded execution mode prior to execution of the present scan; and wherein the instructions are executable by the physical processing resource to:

adapt the scan parameter by setting the scan thread parameter to a single-threaded execution mode for sending the subsequent scan request; and send the subsequent scan request in a single-threaded execution mode instead of the multi-threaded execution mode as was configured prior to execution of the present scan.

15. The non-transitory machine-readable medium of claim 14, wherein the instructions are further executable by the physical processing resource to, after sending the subsequent scan request in the single-threaded execution mode, reset the scan thread parameter back to the multi-threaded execution mode prior to sending a different scan request also part of the present scan.

16. The system of claim 1, wherein the subsequent scan portion of the web application further includes removing at least one of the scan requests from the plurality of scan requests.

17. The method of claim 8, wherein the subsequent scan portion of the web application further includes removing at least one scan requests from the plurality of scan requests of the present scan.

18. The non-transitory machine-readable medium of claim 13, wherein the instructions are further executable by the physical processing resource to remove at least one of the scan requests from the plurality of scan requests previously sent as part of the present scan.

19. The system of claim 1, wherein the subsequent scan portion of the web application is executed during the present scan.

20. The method of claim 8, wherein the subsequent scan portion of the web application is executed during the present scan.

* * * * *